July 18, 1933.  L. W. STETTNER  1,918,720
GAS PRESSURE REGULATOR
Filed Dec. 2, 1929   2 Sheets-Sheet 2

INVENTOR.
LUDWIG W. STETTNER
BY Miller Boyken & Bried
ATTORNEYS.

Patented July 18, 1933

1,918,720

UNITED STATES PATENT OFFICE

LUDWIG W. STETTNER, OF OAKLAND, CALIFORNIA, ASSIGNOR TO VICTOR WELDING EQUIPMENT CO., OF SAN FRANCISCO, CALIFORNIA, A CORPORATION OF DELAWARE

GAS PRESSURE REGULATOR

Application filed December 2, 1929. Serial No. 411,023.

This invention relates to gas pressure regulators as used for gases stored under high pressure such as oxygen and acetylene in automatically reducing and maintaining them at suitable working pressures.

The objects of the invention are to effect general improvements in such a regulator whereby its operation is more reliable.

In the drawings hereto annexed Fig. 1 is a vertical section taken along the line 1—1 of Fig. 3.

Figure 1:
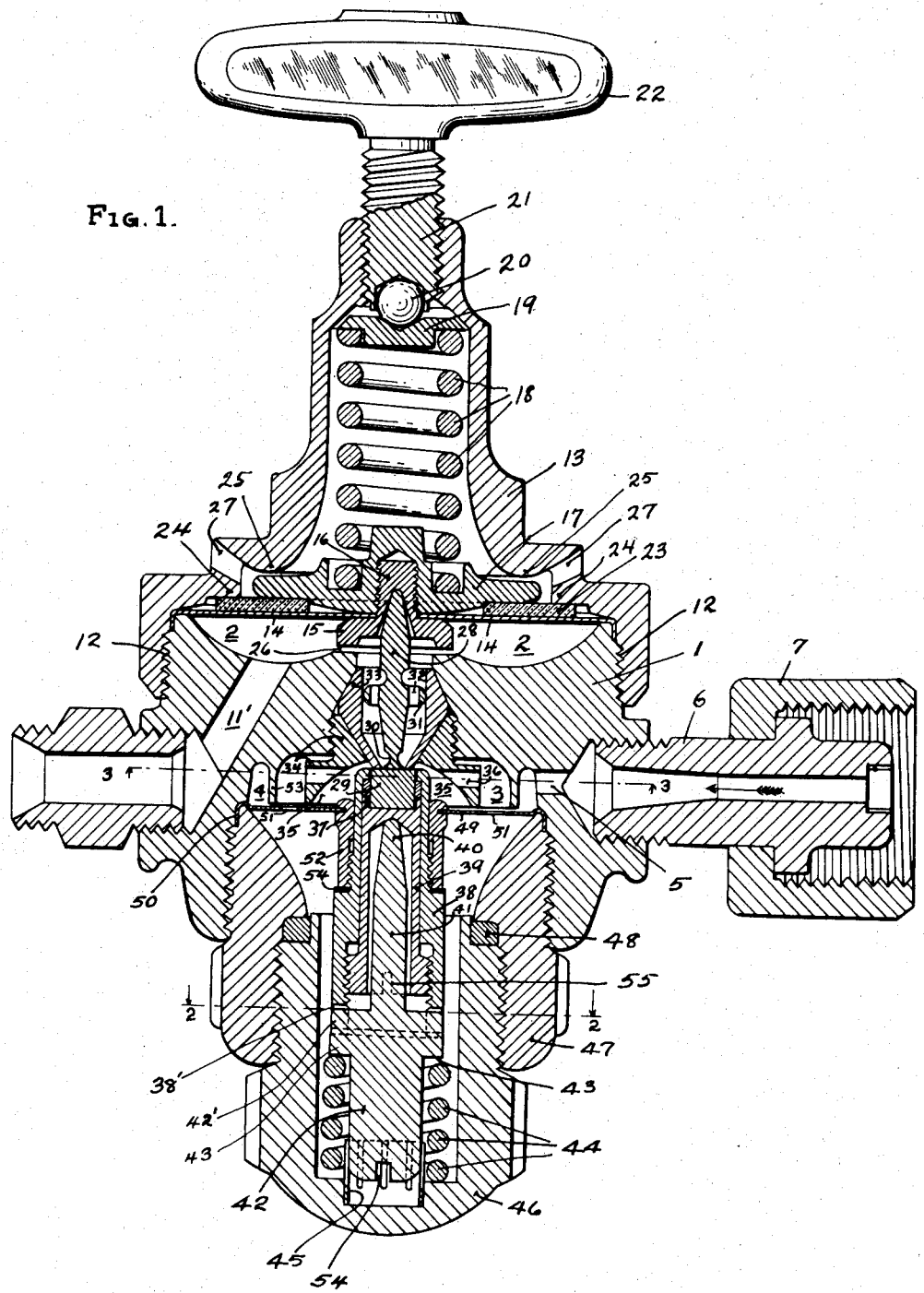

In the figures, 1 is the regulator body provided with a low pressure chamber 2, high pressure chamber 3, an annular secondary or outer high pressure chamber 4 connecting with an inlet passage 5 to which a threaded pipe nipple 6 and coupling nut 7 is shown attached.

Another similar passage 8 is shown connecting the annular chamber 4 for threadedly attaching a high pressure gage, while three other similar passages 9, 10 and 11 are provided which are drilled at an angle as at 9', 10', 11' to communicate only with the low pressure chamber 2.

Passage 11 is for screwing thereto of a low pressure gage, while passages 9 and 10 are for attaching the working hose lines.

The upper end of the body is threaded at 12 and screwed thereover is a bonnet 13, while clamped between the bonnet and rim around the body is a flat diaphragm 14 having its margin turned down over the body rim.

The diaphragm is pierced in its center and provided on its under side with an inverted cup-shaped hub 15 having a threaded stem 16 passing through the diaphragm and screwed into a metal washer or backing member 17 clamping same tightly to the diaphragm. Backing member 17 is recessed on top for a spiral spring 18 fitted at its upper end with a floating hub 19 slightly recessed on its outer end for a steel ball 20 which in turn is seated in a recess at the lower end of a stem 21 screwed into the upper end of the bonnet and carrying at its outer end a handle 22 for adjusting the tension of spring 18. Backing washer 17 is convexly curved at its under side to correspond substantially with the curve of the diaphragm when deflected and the marginal portion of the washer is recessed slightly to overlie a soft resilient rubber ring or washer 23 which extends nearly the diameter of the diaphragm and under an overhanging annular shoulder 24 formed on the bonnet.

It should be noted that in Fig. 1 the parts are supposed to be in position as when there is a working pressure in the low pressure side (chamber 2) and at which time there is a small clearance between the backing washer 17 and a shoulder 25 on the bonnet, and a somewhat larger clearance between the inverted cup-shaped hub 15 and the body as shown at 26.

The bonnet is provided with holes at 27 to vent the outer side of the diaphragm to atmospheric pressure.

Diaphragm hub 15 is recessed upwardly above the plane of the diaphragm and within the recess is freely positioned a valve actuating pin 28 provided with a rounded conical upper end. The lower end of the pin has a flat foot resting against a valve button 29 and is necked at 30 just above the foot, while the intermediate portion of the pin is provided with a circular flange 31 drilled with small holes 32 and the flange is guided in a tubular valve nozzle 33.

Valve nozzle 33 is of double conical form on its outside, conical at the lower part inside, and is clamped between complementary conical seats formed in the body and a nut 34 screwed into the body from the high pressure chamber. This nut is shown hexagon, though it may be of any exterior form, and it is provided with a hollowed out central portion 35 forming a central high pressure gas chamber adjacent the lower end of the valve nozzle 33, and provided with a series of tangentially arranged passages 36 extending to chamber 3.

Valve button 29 may be of any desired material and is mounted as a unit within a metal shell or ferrule provided with a flange 37 clamped between tubular members 38, 39 screwed one within the other and the inner one suspended on the upper rounded end 40 of a pin 41 extending upward from a round boss 42 flanged outwardly at 43 and supported on a spiral compression spring 44 for resiliently pushing the valve upward against the tension of diaphragm spring 18 in the well known way in which such regulators operate.

The lower end of boss 42 is guided in a thin spring metal split thimble 45 seated in a depression in a cap 46 screwed into a tubular piece 47 in turn screwed into the body 1, the joint between members 46 and 47 being preferably sealed with a metal gasket ring 48.

The upper end of valve holding member 38 is guided for vertical motion by means of a metal diaphragm 49 clamped between the rounded upper rim of member 47 and an internal shoulder on the body, the diaphragm being formed with an outer lip 50 turned down over the rim of member 47 as shown, and also provided with pressure vent holes 51 for balancing opposite sides.

This diaphragm has firmly secured to it, as by spinning or otherwise, a downwardly extending tubular hub 52 threaded internally for a short distance at its lower end and with a straight bore at its upper end so as to centralize valve holding member 38 which is threaded and formed to fit and project through the hub above the upper end of same bringing valve button 29 to bear against the lower end of nozzle 33 and close the same when the diaphragm 49 is substantially straight and in which position it clears nut 34 and annular rib 53 which separates chambers 3 and 4.

In order to provide for vertical adjustment of the valve holder 38 in hub 52 a laminated shim washer 54 is positioned between the lower end of hub 52 and a shoulder formed on member 38, so that by unscrewing the members and removing a shim and re-screwing together the valve 29 will project slightly higher.

Figure 2:
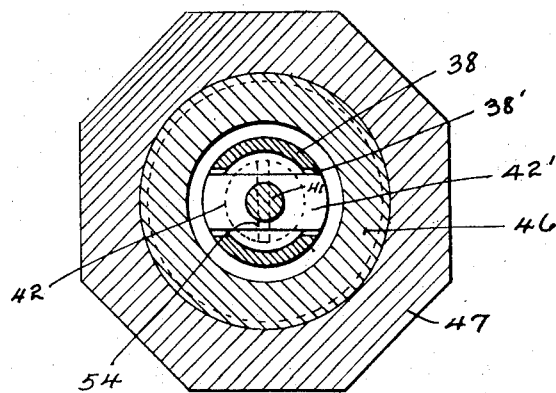
Fig. 2 is a cross section of Fig. 1 as seen from the line 2—2 thereof.

To provide for screwing holder 38 and assemblage into place through the diaphragm hub 52 when cap 46 is removed but the diaphragm is held in place by member 47, the lower end of tubular member 38 is transversely slotted as at 38' and the sides of member 42 are cut away to form a key 42' (see Fig. 2) lying in slot 38' so that member 38 may be turned by turning member 42, the lower end of the latter being slotted at 54 for a screw-driver.

A screw-driver slot 55 is also provided in the lower end of valve button clamping member 39 so that it may be screwed in and out of member 38 when inserting or reversing valve buttons.

By the construction of the lower portion of the regulator it will be seen that the vertical movements of valve 29 are guided by flexing of diaphragm 49 to which it is securely attached, also that the valve is suspended on a rocker point 40 almost in the plane of this diaphragm, that the assemblage may be removed without removing the diaphragm, yet its projection therethrough may be positively adjusted.

By the construction of the upper portion with end of spring 18 seated in a recess in plate 17 the spring is brought very close to the plane of the main diaphragm 14, and by recessing stop member 15 upwardly the bearing end of the valve pin 28 is brought above the diaphragm substantially in line with the lower end of spring 18. This is a very important feature of the construction in overcoming tendency of the diaphragm to rock.

Figure 3:
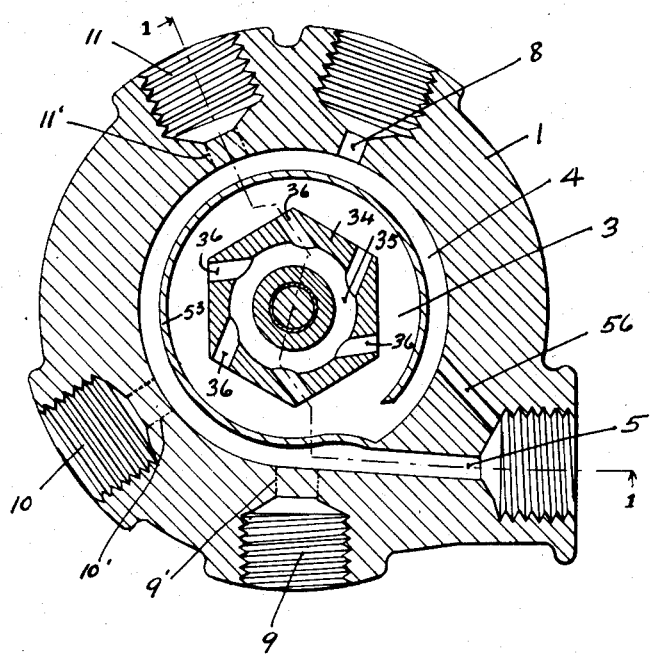
Fig. 3 is a cross section of Fig. 1 as seen from the line 3—3 thereof.

Also, by provision of concentric high pressure chambers 35, 3 and 4, separation of the latter two by annular rib 53, and tangential ports 36 connecting chambers 35 and 3, the incoming high pressure gas from passage 5 (see Fig. 3) must make a complete turn in chamber 4 to gain admission to chamber 3 and must then pass tangentially through several passages 36 before reaching the lower end of nozzle 33 and hence cannot directly impinge thereon to cause freezing but is in swirling circular or centripetal motion as it passes through the valve opening to the low pressure chamber 2 upon the proper adjustment of pressure regulating spring 18 with hand screw 22.

Points of importance are the diaphragm rubber backing washer 23 having its outer margin under a shoulder 24 formed on the bonnet 13, the curved lower surface of metal backing plate 17, and the upward limiting movement of this plate 17 by a second shoulder 25 formed on the bonnet.

Another point is a drain passage 56 leading from the outer high pressure chamber 4 back to the inlet 5 so as to drain any condensation back into the gas cylinder, it being understood that the inlet 5 is arranged to be lowermost on the device when installed.

Having thus described my improvements and indicated the mode of operation thereof so that anyone skilled in the art may clearly grasp the same, I claim:

1. In a gas pressure regulator of the character described having high and low pressure chambers and a spring controlled valve positioned therebetween, an annular wall dividing the high pressure chamber into an inner and outer chamber and with a tangential passageway to the inner chamber whereby entering gases take a spiral swirling motion, and means for admitting high pressure gas to the outer chamber for passing around said wall to the inner chamber.

2. In a gas pressure regulator of the character described having high and low pressure chambers and a spring controlled valve positioned therebetween, an annular wall dividing the high pressure chamber into an inner and outer chamber and with a tangential passageway to the inner chamber whereby entering gases take a spiral swirling motion, a central chamber surrounding the valve within the inner chamber ported tangentially to said inner chamber and means for admitting high pressure gas tangentially to the outer chamber for passing around said wall to the inner chamber.

3. In a gas pressure regulator of the character described having high and low pressure chambers and a spring controlled valve positioned therebetween, an annular wall dividing the high pressure chamber into an inner and outer chamber and with a tangential passageway to the inner chamber whereby entering gases take a spiral swirling motion, a nut holding part of the valve in place and hollowed out to form a central chamber surrounding the valve within the inner chamber ported tangentially to said inner chamber and means for admitting high pressure gas tangentially to the outer chamber for passing around said wall to the inner chamber.

4. In a gas regulator of the character described having a body with high and low pressure chambers and a spring controlled valve positioned therebetween, a diaphragm over the low pressure chamber, a central plate against the outer side of the diaphragm, a bonnet over the diaphragm secured to said body, a compression spring reacting between said plate and said bonnet, and a washer of soft resilient material positioned against the outer side of the diaphragm between the margin of said plate and the diaphragm and extending under and in contact with a marginal shoulder formed on said bonnet overlying said diaphragm.

5. In a gas pressure regulator a valve mounting comprising a pair of tubular members threaded one within the other, a valve button gripped between the outer ends of the members, means guiding the outer member for reciprocatory movement and in which said member is threaded, and a supporting pin positioned freely within the inner member suspending the member at a point adjacent the under side of said button, said supporting pin provided with a transversely extending device at its base engaging a transverse slot in said outer member whereby said last-mentioned member may be turned by turning the pin.

6. In a gas pressure regulator a valve mounting comprising a pair of elongated telescopic tubular members threaded one within the other, the outer member formed at its outer end with a shoulder overhanging the inner member, a valve button gripped between the outer end of the inner member and said shoulder, a diaphragm surrounding the outer member arranged for guiding it by flexing of the diaphragm, said diaphragm provided with a tubular hub in which said outer member is screwed.

LUDWIG W. STETTNER.